United States Patent
Park

(10) Patent No.: US 10,846,013 B1
(45) Date of Patent: Nov. 24, 2020

(54) DATA STORAGE DEVICE AND OPERATION METHOD THEREOF

(71) Applicant: SK hynix Inc., Gyeonggi-do (KR)

(72) Inventor: Jong Won Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/718,000

(22) Filed: Dec. 17, 2019

(30) Foreign Application Priority Data

Jul. 5, 2019 (KR) .................. 10-2019-0081576

(51) Int. Cl.
*G06F 11/14* (2006.01)
*G06F 3/06* (2006.01)
*G06F 11/20* (2006.01)
*G06F 1/3234* (2019.01)

(52) U.S. Cl.
CPC .......... *G06F 3/0652* (2013.01); *G06F 1/3268* (2013.01); *G06F 3/0611* (2013.01); *G06F 3/0616* (2013.01); *G06F 3/0658* (2013.01); *G06F 3/0659* (2013.01); *G06F 3/0673* (2013.01); *G06F 11/2023* (2013.01)

(58) Field of Classification Search
CPC .... G06F 1/3268; G06F 3/0616; G06F 3/0658; G06F 3/0659; G06F 11/2023; G06F 3/0611
USPC ...................................... 365/189.11
See application file for complete search history.

(56) References Cited

U.S. PATENT DOCUMENTS 10,372,558 B2 * 8/2019 Park .................... G06F 11/0766
2017/0315879 A1 * 11/2017 Park .................... G06F 11/0766

FOREIGN PATENT DOCUMENTS

KR 1020170021402 2/2017
KR 1020170124673 11/2017

* cited by examiner

*Primary Examiner* — Xiaochun L Chen
(74) *Attorney, Agent, or Firm* — IP & T Group LLP

(57) ABSTRACT

A data storage device may include: a storage; and a controller configured to control data input/output for the storage, wherein the controller comprises a power state manager configured to detect a failure of an operation that is performed in the storage based on a program, erase or read command, transfer a power state check request command to the storage when the failure is detected, and reset the storage based on whether the storage transfers a return signal in response to the power state check request command.

13 Claims, 7 Drawing Sheets

DATA STORAGE DEVICE AND OPERATION METHOD THEREOF

CROSS-REFERENCES TO RELATED APPLICATION

The present application claims priority under 35 U.S.C. § 119(a) to Korean application number 10-2019-0081576, filed on Jul. 5, 2019, in the Korean Intellectual Property Office, which is incorporated herein by reference in its entirety.

BACKGROUND

1. Technical Field

Various embodiments generally relate to a semiconductor integrated device, and more particularly, to a data storage device and an operation method thereof.

2. Related Art

A storage device is coupled to a host device and performs a data input/output operation according to a request of the host device. The storage device may use a variety of storage media to store data.

The storage device may include a device for storing data in a magnetic disk, such as a hard disk drive (HDD), or a device for storing data in a semiconductor memory device, specifically a nonvolatile memory such as a solid state drive (SSD) or a memory card.

A storage medium using a flash memory has various advantages. For example, when the storage medium has a large storage capacity, the flash memory may support a nonvolatile characteristic, have an advantage on a low cost and a small power consumption, and provide a high data processing speed.

SUMMARY

In an embodiment, a data storage device may include: a storage; and a controller configured to control data input/output for the storage, wherein the controller comprises a power state manager configured to detect a failure of an operation that is performed in the storage based on a program, erase or read command, transfer a power state check request command to the storage when the failure is detected, and reset the storage based on whether the storage transfers a return signal in response to the power state check request command.

In an embodiment, a data storage device may include: a is storage; and a controller configured to control a data input/output operation performed in the storage, wherein the controller transfers a power state check request command to the storage, in order to monitor whether power is supplied again to the storage, while the controller does not recognize power-off after the power of the storage is cut off.

In an embodiment, there is provided an operation method of a data storage device which includes a storage and a controller for controlling the storage. The operation method may include transferring a program, erase or read command to the storage; checking whether an operation of the storage based on the program, erase or read command succeeded or failed; transferring a power state check request command to the storage, when the operation of the storage fails; and resetting the storage based on whether the storage transfers a return signal in response to the power state check request command.

In an embodiment, a memory system may include: a nonvolatile storage; and a controller configured to monitor a state of power supplied to the nonvolatile storage and check an error in at least one of a response or a piece of data outputted from the nonvolatile storage in response to controller's request, wherein the controller is configured to determine how to reset or recover the nonvolatile storage based on the state of the power and the error.

DETAILED DESCRIPTION

Hereinafter, a data storage device and an operation method thereof according to this disclosure will be described below with is reference to the accompanying drawings through exemplary embodiments.

Specific structural and functional description are directed to various embodiments of the present invention. The present invention, however, is not limited to the disclosed embodiments nor any particular detail.

Rather, the present invention may be realized in many different forms and thus covers all modifications, equivalents and alternatives that fall within the spirit and scope of the present invention. Also, throughout the specification, reference to "an embodiment" or the like is not necessarily to only one embodiment, and different references to any such phrase are not necessarily to the same embodiment(s).

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that describe the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise.

Detailed description of functions and structures well known to those skilled in the art are omitted to avoid obscuring the subject matter of the present invention. This aims to make the subject matter of the present invention clear.

Figure 1:
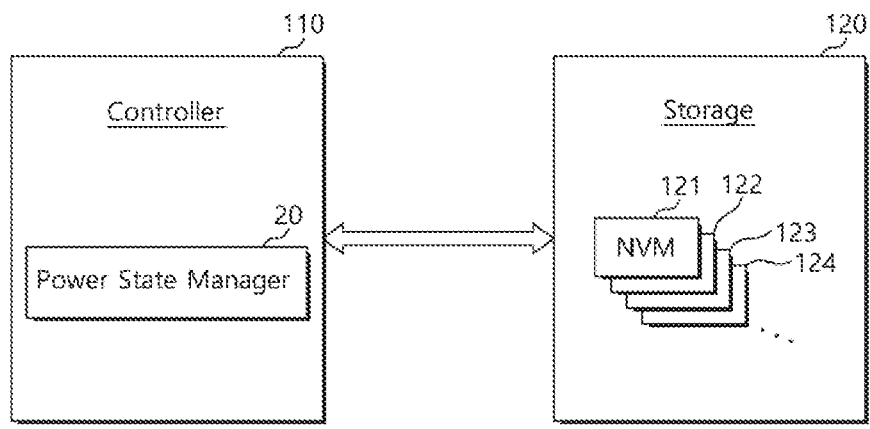
FIG. 1 is a diagram illustrating a data storage device in accordance with an embodiment.

FIG. 1 is a diagram illustrating a data storage device in accordance with an embodiment.

Referring to FIG. 1, a data storage device 10 may include a controller 110 and a storage 120, which may operate under control of a host device.

The controller 110 may control the storage 120 in response to a request inputted from the host device. For example, the controller 110 may control the storage 120 to program data thereto according to a write request inputted from the host device. Also, the controller 110 may output data stored in the storage 120 to the host device in response to a read request inputted from the host device.

The storage 120 may write data therein or output data written therein under control of the controller 110. The storage 120 may include a volatile or nonvolatile memory device. In an embodiment, the storage 120 may be implemented with a memory device selected among various nonvolatile memory devices such as an Electrically Erasable and Programmable ROM (EEPROM), NAND flash memory, NOR flash memory, Phase-Change RAM (PRAM), Resistive RAM (ReRAM), Ferroelectric RAM (FRAM) and Spin Torque Transfer Magnetic RAM (STT-MRAM). The storage 120 may include a plurality of nonvolatile memory devices (NVM) 121 to 124. The NVM may include a plurality of dies Die 0 to Die n, a plurality of chips or a plurality of packages. Furthermore, the storage 120 may operate as a device including a plurality of single-level cells, each configured to store one-bit data therein, or a device including a plurality of multi-level cells, each configured to store multi-bit data therein.

In an embodiment, the storage 120 may have a hierarchical structure including at least one die including at least one plane, each plane including a plurality of memory blocks, each memory block including a plurality of pages, each page including a plurality of cells.

Although not illustrated, the storage 120 may include a system area and a user area. The system area may store various system data, which supports an operation performed in the storage 120. The system data, which is required for driving firmware, may include various types of data such as a map table and initialization information, operating bias information, operation timing information, bad block information, repair information and operation state information of the storage 120.

The user area of the storage 120 may include a plurality of user data blocks configured to store write data inputted from the host device. The controller 110 may select at least one memory block among the plurality of user data blocks, and control the storage 120 to store the write data in the selected block. A memory block, which is selected by the controller 110 and used for a data program operation, may be referred to as an open block, and a memory block which has been completely used may be referred to as a closed block.

In an embodiment, the controller 110 may include a power state manager 20.

When an operation of the storage 120 based on a command transferred to the storage 120 by the controller 110 fails, the power state manager 20 may detect the failure. Moreover, the power state manager 20 may detect the failure.

In an embodiment, the controller 110 may transfer a program or erase command to the storage 120. The storage 120 may perform a program or erase operation in response to the program or erase command inputted from the controller 110, and transfer a return signal (e.g., a response) according to the command processing result. The storage 120 may transfer a pass signal as the return signal when the program or erase operation was successfully performed. Otherwise, the storage 120 may transfer a fail signal as the return signal. When the fail signal is transferred as the return signal from the storage 120 or no return signal is transferred within a set time, the power state manager 20 may determine that an operation of the storage 120 failed.

In an embodiment, the controller 110 may transfer a read command to the storage 120. The storage 120 may perform a read operation in response to a read command provided from the controller 110, and transfer the return signal according to the processing result. When the read operation was successfully is performed, the storage 120 may transfer the pass signal as the return signal along with read data. On the other hand, when the read operation failed, the storage 120 may transfer the fail signal as the return signal with no read data. When the storage 120 transfer meaningless data that uncorrectable error by controller 110, the controller 110 may determine a failure of the read operation. When the fail signal is transferred as the return signal from the storage 120, the meaningless data is returned to cause UECC, or no return signal is transferred within the set time, the controller 110 may determine that the read operation of the storage 120 has failed.

When the operation of the storage 120 has failed, the power state manager 20 may transfer a power state check request command to the storage 120.

In an embodiment, the power state check request command may be a device ID read command (Read ID), but is not limited thereto.

The ID read command is a kind of command for acquiring additional information such as a manufacturer, a serial number, a storage capacity, and the like regarding the storage 120. As in the embodiment, the ID read command may be used to check a coupling state between the storage 120 and the controller 110.

The power state manager 20 may re-set the storage 120 based on the return signal of the storage 120, which is returned in response to the power state check request command. The re-setting of the storage 120 may include an operation of resetting or is recovering the storage 120.

In an embodiment, when the storage 120 does not respond to the power state check request command, that is, when the storage 120 does not transfer the return signal, the power state manager 20 may reset the storage 120. Such a situation may indicate that power is supplied again after "unrecognized SPO" in which the power of the storage 120 is suddenly removed due to unstable power supply, while the controller 110 does not recognize the SPO. Although power is supplied again after the unrecognized SPO, the storage 120 is not ready to operate, while power is only supplied. Therefore, the storage 120 cannot correspond to a command of the controller 110. Thus, when the storage 120 does not transfer the return signal for the power state check request command, the power state manager 20 may reset the storage 120.

In an embodiment, when the storage 120 transfers the return signal for the power state check request command but the return signal includes the fail signal or the meaningless data, the power state manager 20 may recover the storage 120. Such a situation may indicate that an error occurred in the storage 120 due to various causes. Therefore, through the recovery operation, the power state manager 20 may recover the storage 120 into a situation before the error occurred.

After resetting or recovering the storage 120, the power state manager 20 may execute the previously failed command again.

Since the controller 110 can monitor the power re-supply is situation after the unrecognized SPO, reset or recover the storage 120, and re-execute the previously failed command, the operation reliability of the data storage device 10 can be guaranteed.

Figure 2:
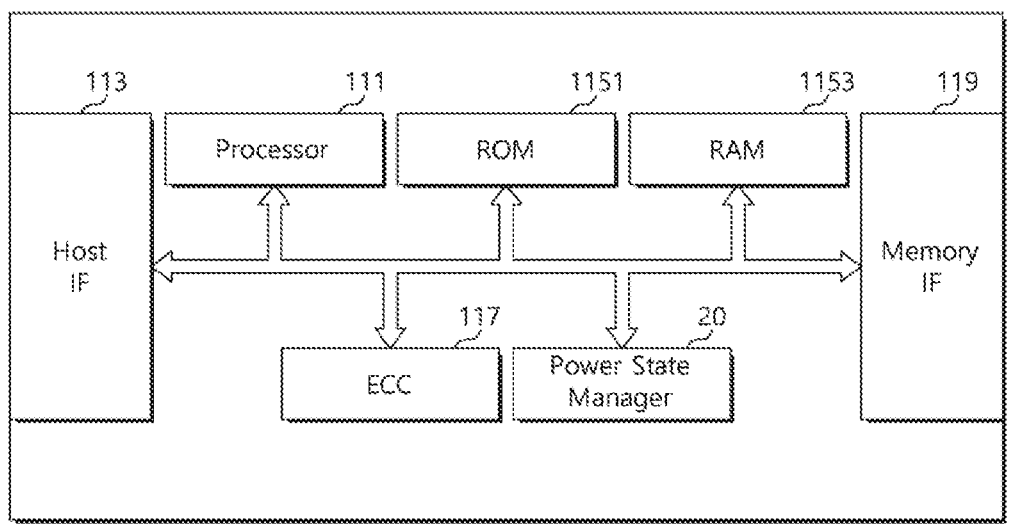
FIG. 2 is a diagram illustrating a controller in accordance with an embodiment.

FIG. 2 is a configuration diagram illustrating the controller in accordance with the embodiment.

Referring to FIG. 2, the controller 110 may include a processor 111, a host interface (I/F) 113, a ROM 1151, a RAM 1153, an Error Correction Code (ECC) circuit 117, a memory I/F 119 and the power state manager 20.

The processor 111 may be configured to transfer various pieces of control information to the host I/F 113, the RAM 1153, the ECC circuit 117, the memory I/F 119 and the power state manager 20, the various pieces of control information being required for an operation of reading or writing data from or to the storage 120. In an embodiment, the processor 111 may operate according to firmware provided for various operations of the data storage device 10, In an embodiment, the processor 111 may perform the function of a flash translation layer (FTL) for performing address mapping, wear leveling, garbage collection, bad block management and the like to manage the storage 120.

The host I/F 113 may provide a communication channel for receiving a command and clock signal from the host device and controlling data input/output, under control of the processor 111. The host I/F 113 may provide a physical connection between the host device and the data storage device 10. Furthermore, the host I/F 113 may provide an interface with the data storage device 10 according to the bus format of the host device. The bus format of the host device may include one or more of standard interface protocols such as secure digital, Universal Serial Bus (USB), Multi-Media Card (MMC), Embedded MMC (eMMC), Personal Computer Memory Card International Association (PCM-CIA), Parallel Advanced Technology Attachment (PATA), Serial Advanced Technology Attachment (SATA), Small Computer System Interface (SCSI), Serial Attached SCSI (SAS), Peripheral Component Interconnection (PCI), PCI Express (PCI-E) and Universal Flash Storage (UFS).

The ROM 1151 may store program codes required for an operation of the controller 110, for example, firmware or software. Furthermore, the ROM 1151 may store code data used by the program codes.

The RAM 1153 may store data required for an operation of the controller 110 or data generated by the controller 110, such as a map table.

The ECC circuit 117 may serve to detect an error of data read from the storage 120, and correct the detected error. The ECC circuit 117 may be included in the processor 111.

The memory I/F 119 may provide a communication channel for transmitting/receiving signals between the controller 110 and the storage 120. The memory I/F 119 may write data received through the host I/F 113 to the storage 120 under control of the processor 111. Furthermore, the memory I/F 119 may transfer data read from is the storage 120 to the host I/F 113.

The power state manager 20 may detect whether an operation of the storage 120 based on a command of the processor 111 fails, and transfer the power state check request command to the storage 120 when the operation fails. The power state manager 20 may reset the storage 120 based on whether the return signal of the storage 120 for the power state check request command is transferred.

In an embodiment, when the storage 120 returns the fail signal, or no response for the set time, or the meaningless data in response to a program, erase or read command of the processor, the power state manager 20 may determine that the operation of the storage 120 failed.

When the operation of the storage 120 has failed, the power state manager 20 may transfer the power state check request command to the storage 120. The power state check request command may include an ID read command, for example, but is not limited thereto.

The power state manager 20 may reset the storage 120, when the storage 120 does not transfer the return signal for the power state check request command, and recover the storage 120 when the storage 120 responds to the power state check request command but storage's response includes the fail signal or the meaningless data.

Figure 3:
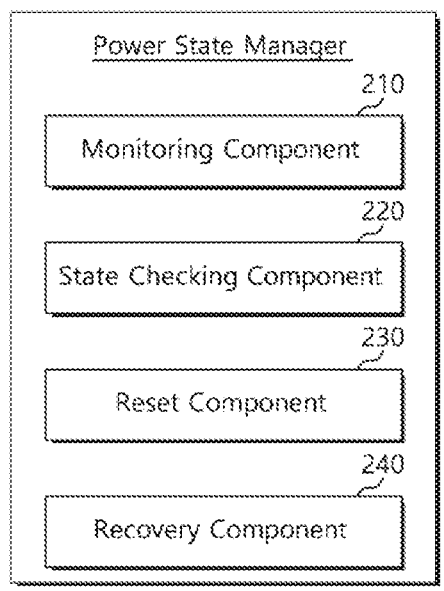
FIG. 3 is a diagram illustrating a power state manager in accordance with an embodiment.

FIG. 3 is a configuration diagram illustrating the power state manager 20 in accordance with the embodiment.

Referring to FIG. 3, the power state manager 20 may include a monitoring component 210, a state checking component 220, a reset component 230 and a recovery component 240.

The monitoring component 210 may determine whether an operation of the storage 120 is successfully performed in response to a command transferred to the storage 120 by the controller 110.

In an embodiment, the controller 110 may transfer a program or erase command to the storage 120. The storage 120 may perform a program or erase operation in response to the program or erase command inputted from the controller 110, and transfer a return signal (e.g., response) according to the command processing result. The storage 120 may transfer a pass signal as the return signal when the program or erase operation was successfully performed. Otherwise, the storage 120 may transfer a fail signal as the return signal. When the fail signal is transferred from the storage 120 or no return signal is transferred within the set time, the power state manager 20 may determine that the operation of the storage 120 failed.

In an embodiment, the controller 110 may transfer a read command to the storage 120. The storage 120 may perform a read operation in response to the read command provided from the controller 110, and transfer the return signal according to the processing result. When the read operation was successfully performed, the storage 120 may transfer the pass signal as the is return signal along with read data. Otherwise, the storage 120 may transfer the fail signal as the return signal with no read data. When the storage 120 transfer meaningless data that causes UECC, the controller 110 may determine a failure of the read operation. When the fail signal is transferred from the storage 120, the return signal with meaningless data is returned to cause UECC, or no return signal is transferred within the set time, the power state manager 20 may determine that the operation of the storage 120 failed.

When the monitoring component 210 determines that the operation of the storage 120 failed, the state checking component 220 may transfer the power state check request command to the storage 120. In an embodiment, the power state check request command may include a device ID read command (Read ID), but is not limited thereto.

When the storage 120 does not transfer the return signal in response to the power state check request command of the state checking component 220, the reset component 230 may reset the storage 120.

In case of an unrecognized SPO in which the power of the storage 120 is suddenly removed and then supplied again due to unstable external power supply, while the controller 110 does not recognize the SPO, the storage 120 performs no operation. Therefore, the reset component 230 may recognize such a situation, and reset the storage so that the storage 120 operates normally.

When the storage 120 transfers the return signal in is response to the power state check request command of the state checking component 220, the recovery component 240 may recover the storage 120. Such a situation may indicate that an error occurred in the storage 120 due to various causes. Therefore, the recovery component 240 can recover the storage 120 into the situation before the error occurred.

After the storage 120 is reset or recovered, the controller 110 may control the storage 120 to execute the failed command again.

Figure 4:
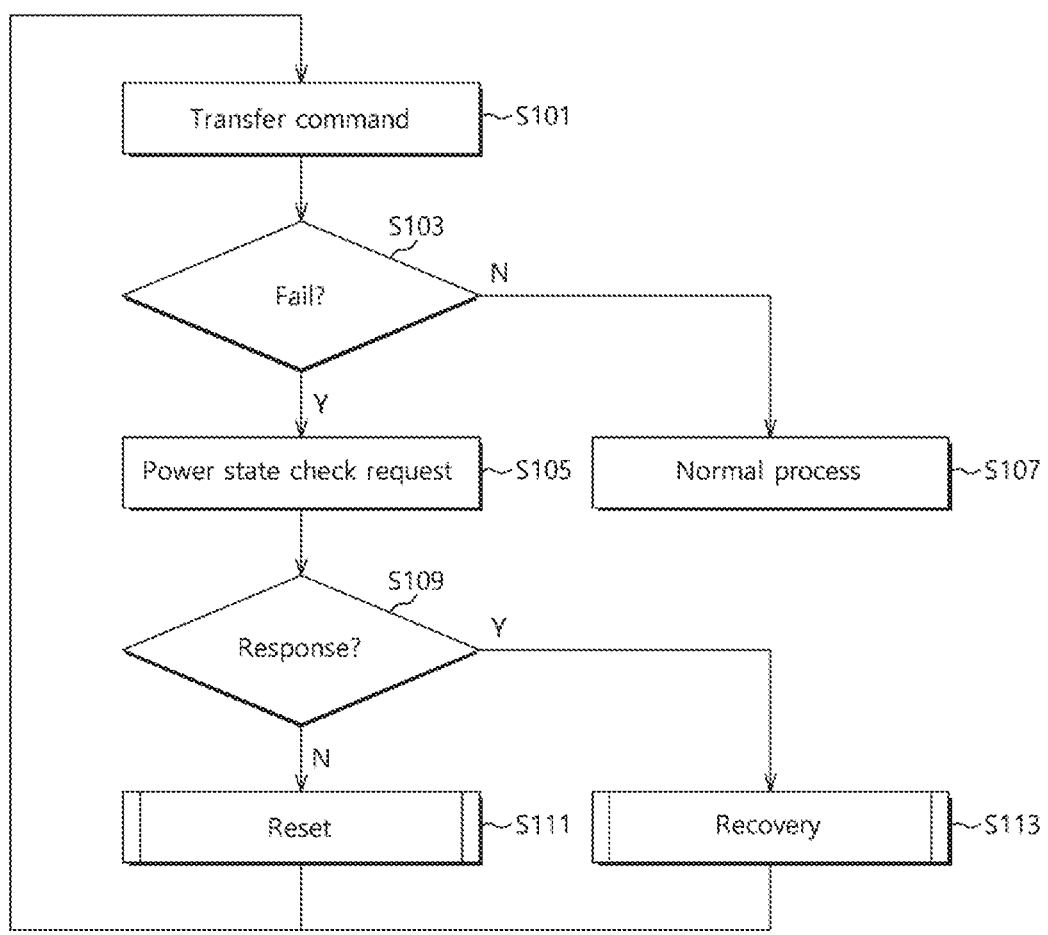
FIG. 4 is a flowchart for describing an operation method of a data storage device in accordance with an embodiment.

FIG. 4 is a flowchart for describing an operation method of a data storage device in accordance with an embodiment.

The controller 110 may transfer a program, erase or read command to the storage 120 in a step S101.

The power state manager 20 of the controller 110 may monitor whether an operation of the storage 120 based on the command of the controller 110 failed, in a step S103.

In an embodiment, the storage 120 may perform a program or erase operation in response to the program or erase command inputted from the controller 110, and transfer a return signal (e.g., a response) according to the command processing result. The storage 120 may transfer a pass signal as the return signal when the program or erase operation was successfully performed. Otherwise, the storage 120 may transfer a fail signal as the return signal. When the fail signal is transferred from the storage 120 or no return signal is transferred within a set time, the power state manager 20 may is determine that the operation of the storage 120 failed.

In an embodiment, the storage 120 may perform a read operation in response to a read command provided from the controller 110, and transfer the return signal according to the processing result. When the read operation was successfully performed, the storage 120 may return the pass signal as the return signal along with read data. Otherwise, the storage 120 may transfer the fail signal or meaningless data that causes UECC. When the fail signal is transferred as the return signal from the storage 120, the return signal with meaningless data is transferred to cause UECC, or no return signal is transferred within the set time, the power state manager 20 may determine that the operation of the storage 120 failed.

When the storage 120 successfully processed the command of the controller 110 (N of the S103), the controller 110 may perform a normal operation in a step S107. For example, the controller 110 may transfer the operation processing result of the storage 120 to the host device and maintain a standby.

On the other hand, when the command processing of the storage 120 failed (Y of the S103), the power state manager 20 may transfer a power state check request command to the storage 120 in a step S105, and check whether the return signal is transferred from the storage 120, in a step S109.

That is, the power state manager 20 may check whether the storage 120 responds to the power state check request command.

The power state check request command may be a device ID read command (Read ID), but is not limited thereto.

When the storage 120 does not respond without transferring the return signal in response to the power state check request command (N of the S109), the power state manager 20 may reset the storage 120 in a step S111 so that the storage 120 operates normally.

When the storage 120 transfers the return signal in response to the power state check request command (Y of the S109), the power state manager 20 may normalize the storage 120 by recovering the storage 120 into the situation before the error occurred, in a step S113.

After the storage 120 is re-set through the reset or recovery operation, the controller 110 may control the storage 120 to execute the failed command again.

Figure 5:
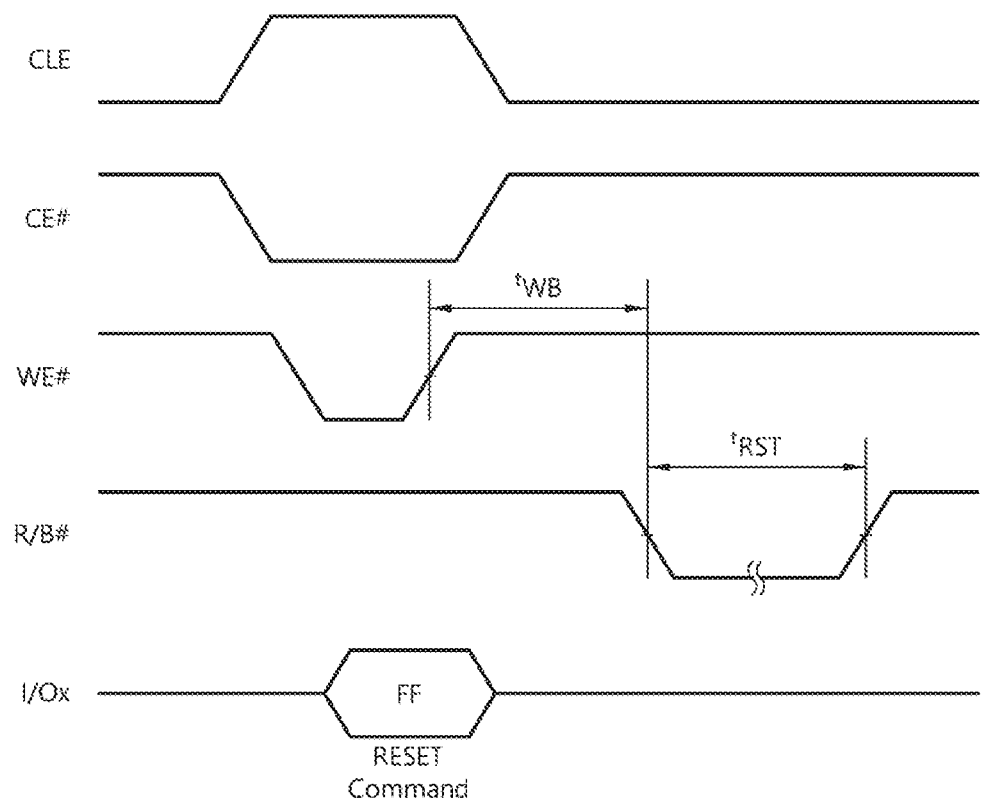
FIG. 5 is a diagram for describing a storage reset method in accordance with an embodiment.

FIG. 5 is a diagram for describing a storage reset method in accordance with an embodiment.

In an embodiment, the controller 110 may enable a command latch enable signal CLE and transfer a reset command FF, in order to reset the storage 120. However, the present embodiment is not limited thereto.

As a predetermined time tWB (WE HIGH to busy) elapses after a write enable signal WE # and the reset command FF are provided, a process of resetting the storage 120 is started and performed for a reset time tRST. The storage 120 may be busy is (R/B #=LOW) for the reset time tRST, and set available for use by the controller 110 after the reset time tRST.

Through the reset process, an internal latch circuit including a page buffer within the storage 120 may be initialized.

Figure 6:
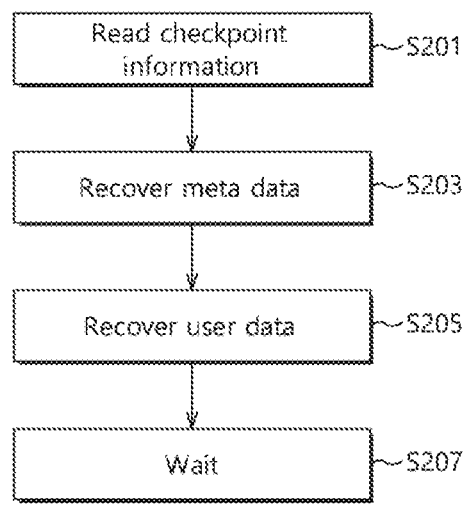
FIG. 6 is a flowchart for describing a storage recovery method in accordance with an embodiment.

FIG. 6 is a flowchart for describing a storage recovery method in accordance with an embodiment.

The situation in which the command processing of the controller 110 failed but the storage 120 transfers the return signal in response to the power state check request command may indicate a situation in which an error occurred in the storage 120 due to various causes. In this case, the power state manager 20 may recover the storage 120 into the situation before the error occurred.

First, the controller 110 may read checkpoint information in a step S201.

The controller 110 may perform a checkpoint operation of collecting and storing information required for a boot sequence or a booting operation in advance, during an operation of the data storage device 10, whenever an event predefined for a recovery situation occurs, and read the checkpoint information for recovery.

In an embodiment, the checkpoint information may include configuration information, map information, an open block count, a next program position, an erase/write (e/w) count, and in-use block information, which are stored in a specific area of the controller 110 or the storage 120 with a checkpoint version and time stamp. The configuration information may include channel (way) information of is the data storage device 10 and the like. The in-use block may include a map block and a data block which are being used at the time of the checkpoint operation.

Based on the checkpoint information, the controller 110 may recover meta data in a step S203, and recover user data in a step S205.

In an embodiment, in order to recover the meta data or user data in the step S203 or S205, the recovery component 240 may read system data from the storage 120 and load the read system data to the RAM 1153, and search for the last access page of an open block which has been used when an error occurred, based on the system data. Then, the recovery component 240 may sequentially read data written in pages before the last access page, generate a P2L list, and store the P2L list in the RAM 1153.

When the data stored in the storage 120 are recovered, the data storage device 10 may be on standby such that the data storage device 10 can be used by the host device, in a step S207.

The reset or recovery process S111 or S113 shown in FIG. 4 is not limited thereto, and various methods can be used as long as the storage 120 can be recovered into an available state by the controller 110.

Figure 7:
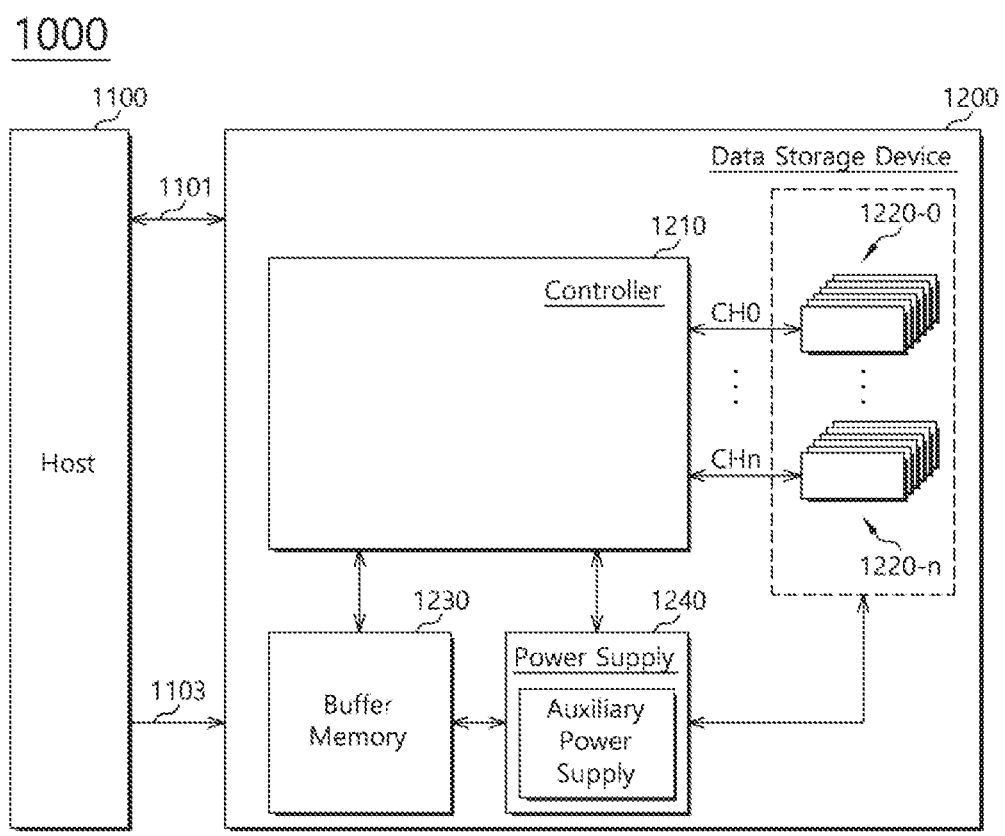
FIG. 7 is a diagram illustrating a data storage system in accordance with an embodiment.

FIG. 7 is a diagram illustrating a data storage system 1000, in accordance with an embodiment.

Referring to FIG. 7, the data storage 1000 may include a host device 1100 and the data storage device 1200. In an is embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may configured as controller 110 shown in FIGS. 1 to 3.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or is at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more types of connectors depending on an interface scheme between the host device 1100 and the data storage device 1200.

The power connector 1103 may be configured as one or more types of connectors depending on a power supply scheme of the host device 1100.

Figure 8:
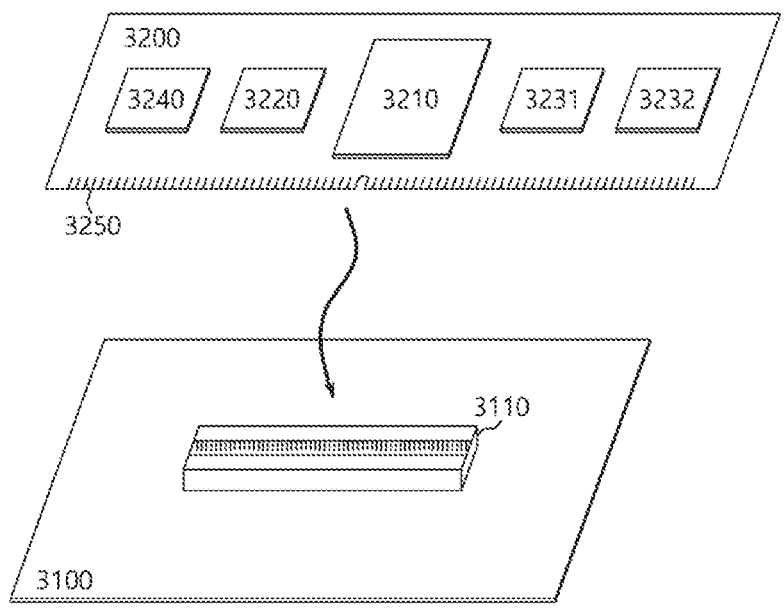
FIG. 8 and FIG. 9 are diagrams illustrating a data processing system in accordance with an embodiment.

FIG. 8 is a diagram illustrating a data processing system 3000, in accordance with an embodiment. Referring to FIG. 8, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231, 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 to 3.

The buffer memory device 3220 may temporarily store data to be stored in the nonvolatile memory devices 3231, 3232. Further, the buffer memory device 3220 may temporarily store data read from the nonvolatile memory devices 3231, 3232. The data temporarily stored in the buffer memory device 3220 may be transmitted to the is host device 3100 or the nonvolatile memory devices 3231, 3232 according to control of the controller 3210.

The nonvolatile memory devices 3231, 3232 may be used as storage media of the memory system 3200.

The PMIC 3240 may provide the power inputted through the connection terminal 3250 to the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 9:
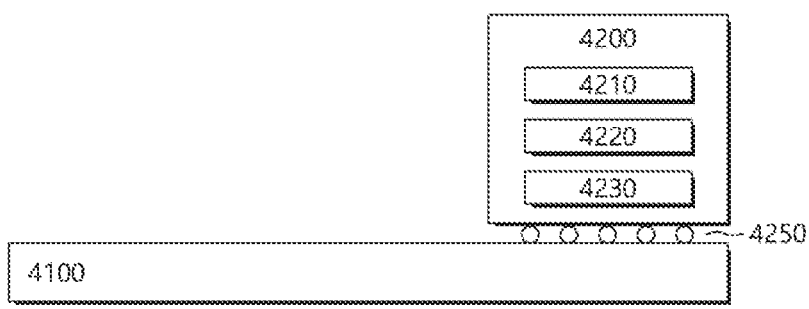

FIG. 9 is a diagram illustrating a data processing system 4000 in accordance with an embodiment. Referring to FIG. 9, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 to 3.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 10:
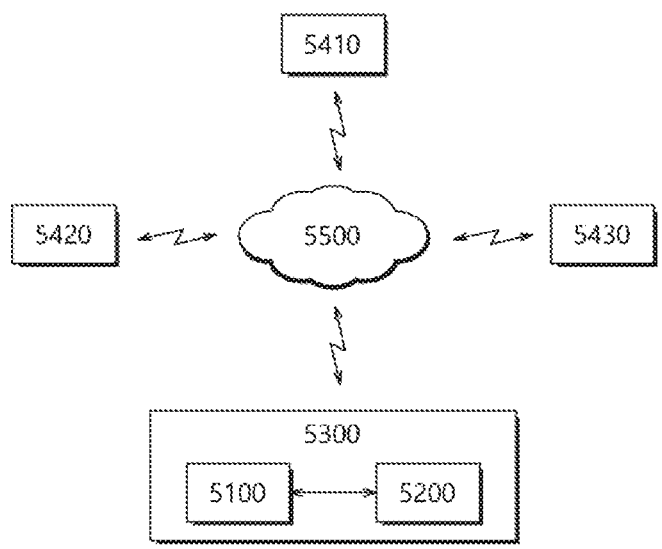
FIG. 10 is a diagram illustrating a network system including a data storage device in accordance with an embodiment.

FIG. 10 is a diagram illustrating a network system 5000 including a data storage device, in accordance with an embodiment. Referring to FIG. 10, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the is plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 7, the memory system 3200 shown in FIG. 8, or the memory system 4200 shown in FIG. 9.

Figure 11:
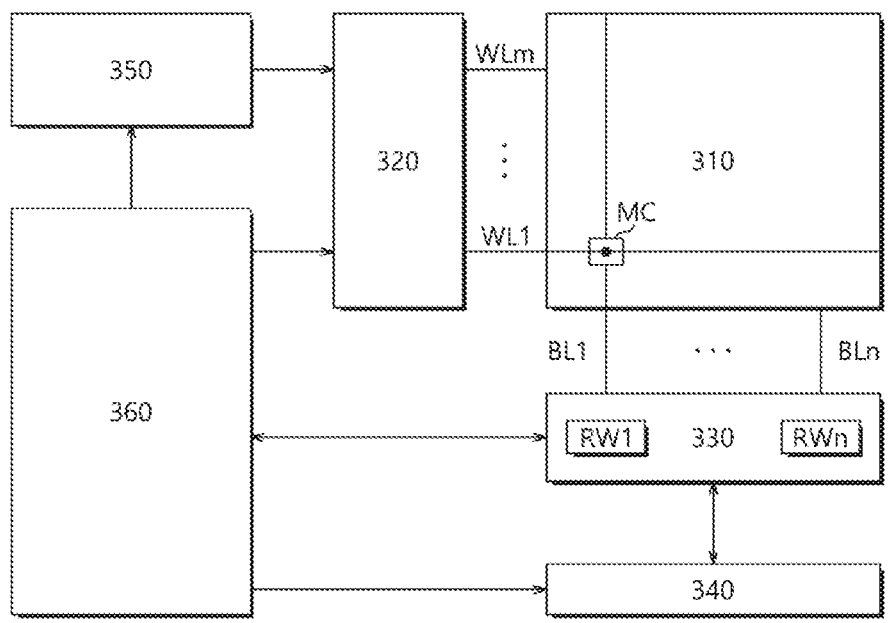
FIG. 11 is a diagram illustrating a nonvolatile memory device included in a data storage device in accordance with an embodiment.

FIG. 11 is a block diagram illustrating a nonvolatile memory device 300 included in a data storage device, such as the data storage device 10, in accordance with an embodiment. Referring to FIG. 11, the nonvolatile memory device 300 may include a memory cell array 310, a row decoder 320, a data read/write block 330, a column decoder 40, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure by perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not is limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the hit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell is array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While various embodiments have been described above, it will be understood to those skilled in the art that the embodiments described are examples only. Accordingly, the data storage device and the operation method thereof, which have been described herein, should not be limited based on the described embodiments.

What is claimed is:

1. A data storage device comprising:
   a storage; and
   a controller configured to control data input/output for the storage,
   wherein the controller comprises a power state manager configured to detect a failure of an operation that is performed in the storage based on a program, erase or read command, transfer a power state check request command to the storage when the failure is detected, and reset the storage based on whether the storage transfers a return signal in response to the power state check request command.

2. The data storage device of claim 1, wherein the storage performs a program or erase operation in response to the program or erase command inputted from the controller, and transfers the return signal according to the command processing result, wherein, when a fail signal is transferred from the storage in response to the program or erase command or no return signal is transferred within a set time, the power state manager determines that the program or erase operation of the storage fails.

3. The data storage device of claim 1, wherein the storage performs a read operation in response to the read command inputted from the controller, and transfers the return signal according to the command processing result,
wherein, when a fail signal is transferred from the storage in response to the read command, meaningless data to cause UECC is transferred, or no return signal is transferred within a set time, the power state manager determines that the read operation of the storage fails.

4. The data storage device of claim 1, wherein the power state check request command comprises a device ID read command.

5. The data storage device of claim 1, wherein the power state manager resets the storage when the storage does not transfer the return signal in response to the power state check request is command.

6. The data storage device of claim 1, wherein the power state manager recovers the storage when the storage transfers the return signal in response to the power state check request command.

7. The data storage device of claim 1, wherein as the storage is reset by the power state manager, the controller retransfers the failed command.

8. A data storage device comprising:
a storage; and
a controller configured to control a data input/output operation performed in the storage,
wherein the controller transfers a power state check request command to the storage, in order to monitor whether power is supplied again to the storage, while the controller does not recognize power-off after the power of the storage is cut off.

9. The data storage device of claim 8, wherein the controller resets the storage, depending on whether the storage transfers a return signal in response to the power state check request command.

10. The data storage device of claim 8, wherein the power state check request command comprises a device ID read command.

11. The data storage device of claim 8, wherein the controller resets the storage when the storage does not transfer a return signal in response to the power state check request command.

12. A memory system, comprising:
a nonvolatile storage; and
a controller configured to monitor a state of power supplied to the nonvolatile storage and check an error in at least one of a response or a piece of data outputted from the nonvolatile storage in response to controller's request,
wherein the controller is configured to determine how to reset or recover the nonvolatile storage based on the state of the power and the error.

13. The memory system of claim 12, the controller is configured to transfer a device ID read command, and resets the nonvolatile storage when the nonvolatile storage does not transfer the return signal in response to the device ID read command.

* * * * *